United States Patent
Pawelko et al.

(10) Patent No.: US 8,118,449 B2
(45) Date of Patent: Feb. 21, 2012

(54) THREADED LED RETROFIT MODULE

(75) Inventors: Wojciech Pawelko, Deer Park, NY (US); Michael Fusco, Smithtown, NY (US)

(73) Assignee: LED Specialists Inc., Kings Park, NY (US)

( * ) Notice: Subject to any disclaimer, the term of this patent is extended or adjusted under 35 U.S.C. 154(b) by 355 days.

(21) Appl. No.: 12/548,552

(22) Filed: Aug. 27, 2009

(65) Prior Publication Data

US 2010/0053957 A1    Mar. 4, 2010

Related U.S. Application Data

(60) Provisional application No. 61/092,194, filed on Aug. 27, 2008.

(51) Int. Cl.
*F21S 4/00* (2006.01)
*F21V 21/00* (2006.01)

(52) U.S. Cl. .............. 362/249.02; 362/311.02; 362/650; 362/800

(58) Field of Classification Search ............. 362/249.02, 362/311.02, 650, 800; 313/318.01, 318.04
See application file for complete search history.

(56) References Cited

U.S. PATENT DOCUMENTS
7,125,159 B2   10/2006  Hirsch et al.

*Primary Examiner* — Jason Moon Han
(74) *Attorney, Agent, or Firm* — Gerald E. Hespos; Michael J. Porco

(57) ABSTRACT

An LED based module designed to be easily retrofitted into existing incandescent based light fixtures with minimum or no modification is provided. The LED module of the present disclosure includes a generally cylindrical threaded adapter module including a flat top surface and a conical bottom portion. The bottom portion includes a threaded cavity for receiving a conventional threaded rod of a light fixture which then couples the LED module to the light fixture. The top surface of the LED module is configured to mount a metal core printed circuit board including at least one LED (light emitting diode). Furthermore, the LED module includes at least two channels running therethrough to accommodate wires or conductors from the light fixture to the metal core printed circuit board. The threaded surface of the LED module is configured to accept a conventional shade retainer ring or nut.

17 Claims, 4 Drawing Sheets ic # THREADED LED RETROFIT MODULE

PRIORITY

This application claims priority to an application entitled "THREADED LED RETROFIT MODULE" filed in the United States Patent and Trademark Office on Aug. 27, 2008 and assigned Ser. No. 61/092,194, the contents of which are hereby incorporated by reference.

BACKGROUND

1. Field

The present disclosure relates generally to lighting, light fixtures, pendent light fixtures, sconce light fixtures and LED lighting, and more particularly, to a threaded light emitting diode (LED) retrofit module. In various embodiments, the LED based lighting module can be retrofitted into existing pendent or sconce light fixtures.

2. Description of the Related Art

Incandescent light bulbs are used in a large variety of lighting products. Although inexpensive to purchase, incandescent light bulbs have several drawbacks. First, incandescent light bulbs use a relatively large amount of power compared to other lighting products which increase energy costs. Second, incandescent light bulbs have a short life causing repetitive replacement costs. Furthermore, since theses bulbs have a short life, labor costs will subsequently be effected by having maintenance personnel constantly replace the bulbs.

Recently, a trend in the lighting industry is to develop light emitting diode (LED) light modules that can be easily adapted to current light fixture products. LED technology offers more than twice the energy efficiency of traditional incandescent bulbs and has 20-30 times the reliability. While LED technology is generally more expensive, there can be a substantial savings in bulb replacement and maintenance costs over a 5-year or greater life-cycle.

There are a very large number of existing light fixture types produced by many lighting OEMs that use a glass or plastic shade secured with a standard threaded bulb socket. There is a great desire of these OEMs to have a means to convert these fixtures from incandescent or CFL to LED technology without modifying the basic fixture or shade structure. This is because a great deal of investment has been made in design and tooling of these fixtures. A single lighting manufacturer may have hundreds of fixture types when considering style, size and finishes.

It is very difficult to design a standard Edison style LED lamp to replace the existing lamp because of size constraints and thermal management requirements of LEDs. A conventional socket (e.g. made from ceramic, plastic, etc.) usually is designed to insulate the light fixture from the heat of an incandescent lamp, where with LEDs it is desirable to conduct the heat from the LEDs into the host light fixture.

Therefore, it would be highly desirable to have a means to replace the existing standard plastic or ceramic threaded socket and light bulb with a device that: (1) has an LED light source and tailored optics; (2) transfers the heat generated by the LED light source to the light fixture; and (3) has a threaded outside surface to accommodate a standard retention ring that holds in place the glass or plastic lamp shade.

SUMMARY

An LED based module designed to be easily retrofitted into existing incandescent based light fixtures with minimum or no modification is provided. The LED module of the present disclosure includes a generally cylindrical, threaded adapter module including a flat top surface and a conical bottom portion. The bottom portion includes a threaded cavity for receiving a conventional threaded rod or stem of a light fixture which then couples the LED module to the fixture. The top surface of the adapter module is configured to mount a metal core printed circuit board including at least one LED (light emitting diode). Furthermore, the adapter module includes at least two channels running therethrough to accommodate wires or conductors from the light fixture to the metal core printed circuit board. The threaded surface of the LED module is configured to accept a conventional shade retainer ring or nut.

In one aspect of the present disclosure, a diffuser may optionally be provided to diffuse the light emanating from the LEDs or may be used to create a desired light pattern. The diffuser may include an integral threaded ring or nut to couple the diffuser directly to the threaded surface of the adapter module of the LED module.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1A:
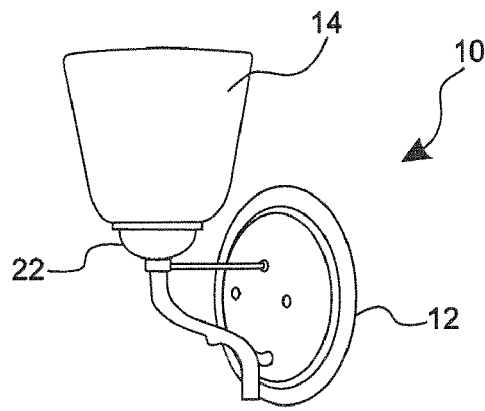
FIG. 1A illustrates a conventional sconce type lighting fixture and FIG. 1B illustrates a conventional pendant type lighting fixture.

Preferred embodiments of the present disclosure will be described hereinbelow with reference to the accompanying drawings. In the following description, well-known functions or constructions are not described in detail to avoid obscuring the invention in unnecessary detail. Throughout the drawings, like reference numerals represent like elements.

A threaded LED retrofit module is provided. The LED module of the present disclosure includes a generally cylindrical, threaded adapter module including a flat top surface and a conical bottom portion. The bottom portion includes a threaded cavity for receiving a conventional threaded rod of a light fixture which then couples the LED module to the light fixture. The top surface of the adapter module is configured to mount a metal core printed circuit board including at least one LED (light emitting diode). Furthermore, the adapter module includes at least two channels running therethrough to accommodate wires or conductors from the light fixture to the metal core printed circuit board. The threaded surface of the LED module is configured to accept a conventional shade retainer ring or nut.

There are many LED based, lamp replacement products on the market that are designed to attach to an existing standard light bulb socket, e.g., a conventional Edison type socket. These are intended for open style lamps and light fixtures where there is open convection and infrared radiation for heat dissipation. The LED based module of the present disclosure is better suited for closed or semi closed fixtures where there is poor air circulation, whereby the light fixture itself is used to dissipate heat to the ambient environment.

Figure 1B:
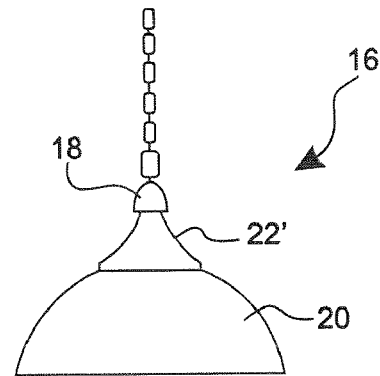

The LED based module of the present disclosure is intended to be retrofitted in existing light fixture or new fixture designs that utilize an attachable light shade as shown in FIGS. 1A and 1B, where FIG. 1A illustrates a sconce type lighting fixture 10 and FIG. 1B illustrates a pendant type lighting fixture 16. These fixtures typically use a threaded socket device made of ceramic or plastic (e.g., insulating material) as shown in FIG. 2.

Figure 2:
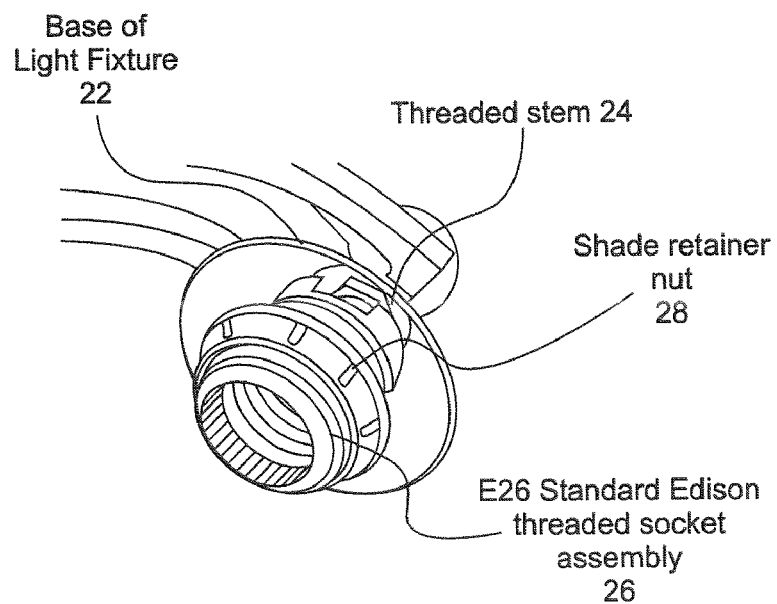
FIG. 2 illustrates a socket assembly of a conventional light fixture.

Referring to FIG. 2, a base 22 of a light fixture typically has a threaded rod/stem 24 that the Edison threaded socket assembly 26 attaches to, either directly or indirectly using other hardware. The threaded socket assembly 26 provides a standard E26 Edison Socket to support conventional medium base incandescent or CFL bulbs. The shade retainer ring or nut 28 is screwed on to the threaded socket assembly 26 after the glass or plastic shade 14, 20 (as shown in FIG. 1) is inserted to secure the shade 14, 20 against a base 22, 22' of the light fixture 12, 18.

Figure 3:
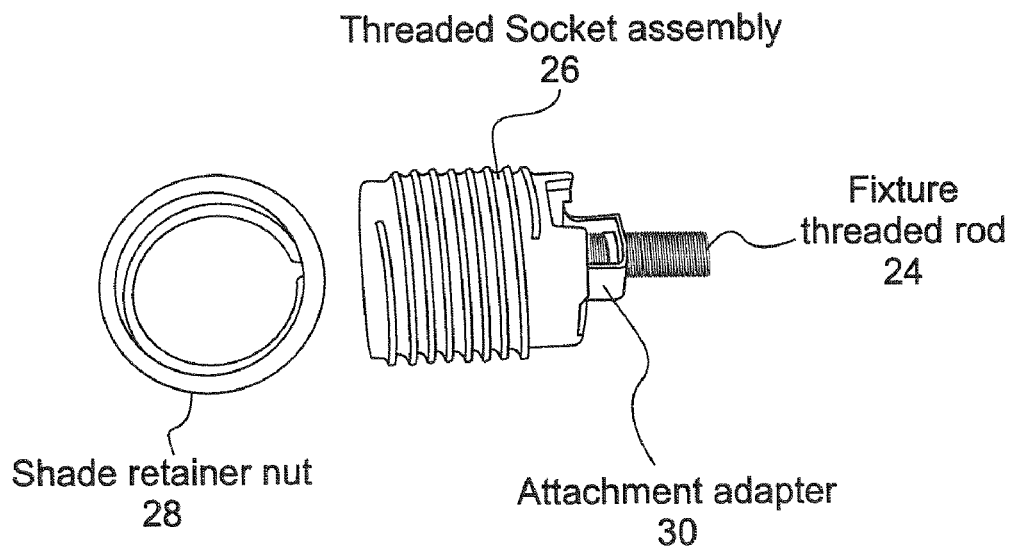
FIG. 3 illustrates an exploded view of the conventional socket assembly shown in FIG. 2.

FIG. 3 more clearly shows a conventional threaded socket assembly 26 and the hardware used to attach the socket assembly 26 to the fixture's threaded rod or stem 24. An additional attachment adapter 30 is typically required for attaching or coupling the fixture threaded rod or stem 24 to the threaded socket assembly 26.

Figure 4A:
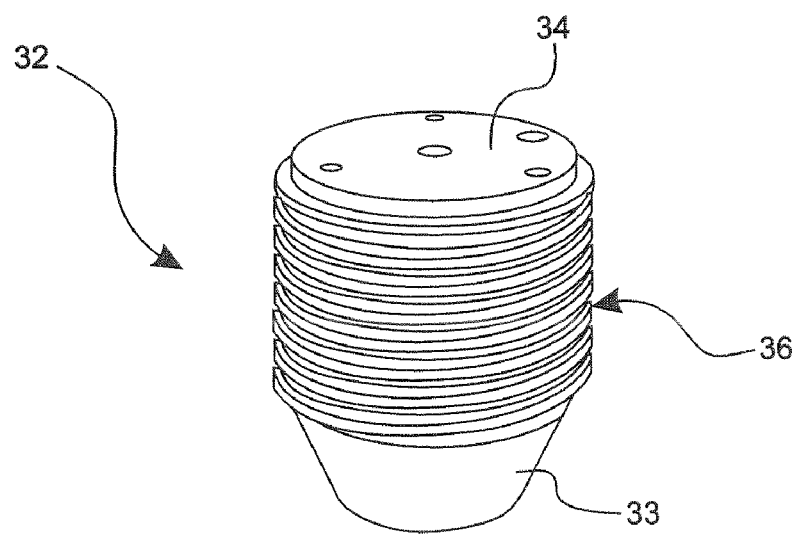
FIG. 4A is a perspective view of an adapter module of an LED module in accordance with the present disclosure.

A perspective view of an adapter module 32 of the LED module of the present disclosure is illustrated in FIG. 4A. The LED module of the present disclosure is a replacement for the threaded socket adapter 26 and attachment adapter 30 as shown in FIG. 3. The adapter module 32 is made from aluminum, copper or other material with high thermal conductivity and generally has a solid construction. In one embodiment, the adapter module 32 is of a unitary construction and is cast or molded with secondary machining or entirely machined from a particular material. In one embodiment, the adapter module 32 is injection molded from a plastic impregnated with conductive fibers or material.

Figure 5:
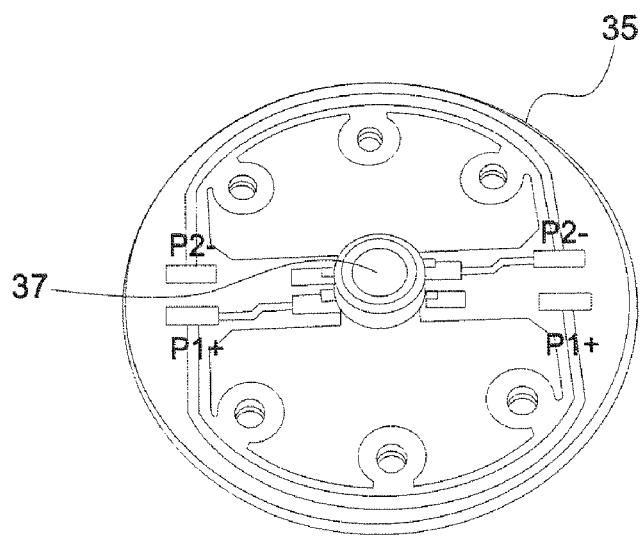
FIG. 5 is a top plan view of a LED board, e.g., a metal core printed circuit board (PCB), according to an embodiment of the present disclosure.

The top surface 34 is designed to mount a light module such as metal core printed circuit board 35, an example of which is shown in FIG. 5. The LED board 35 may contain one or more LEDs 37. The LED board 35 is of a flat circular or disc-like shape, the circumference of which is of substantially the same size as the circumference of the top surface 34 of the adapter module 32. When the LED board 35 is mounted to the adapter module 35, a bottom surface of the LED board 35 is in substantially full contact with the top surface of the adapter module 32. In this manner, the heat generated by the LEDs 37 is transferred to the LED board 35 and then to the adapter module 32 which subsequently transfers the generated heat to the host light fixture, e.g., light fixtures 10, 16 shown in FIG. 1.

It is to be appreciated that in certain embodiments the light module may include at least one LED that is mounted directly to the top surface 34 of the adapter module 32 without the use of a printed circuit board.

The bottom portion 33 of the adapter module 32 has a conical shape to match a corresponding part of the light fixture, e.g., base 22, 22'. Although the embodiments shown have a conical bottom portion 33 other shapes are contemplated and may be selected based on the host lighting fixture or on their thermal management properties, e.g., to create more surface area.

Figure 4B:
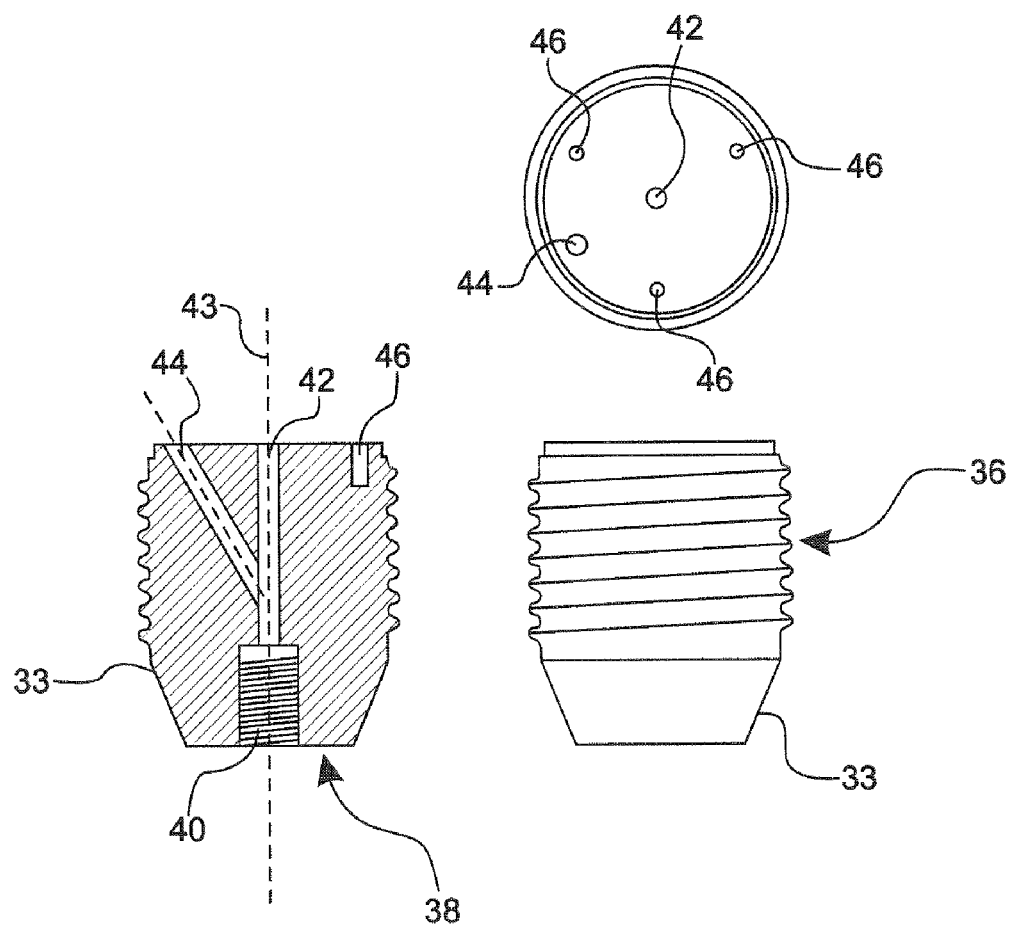
FIG. 4B illustrates a top view, side view and cross sectional view of the adapter module shown in FIG. 4A.

FIG. 4B illustrates a top view, side view and cross sectional view of the adapter module 32. The outside surface 36 of the LED module 32 is threaded to accommodate a standard shade retainer ring or nut 28 shown in FIG. 3. The bottom side 38 of the adapter module 32 includes a cavity 40 which is threaded to accommodate the standard fixture threaded stem 24, which could come in different diameters. The threaded cavity 40 extends from the second end or bottom side 38 into the cylindrical adapter module 32 along a central longitudinal axis 43 of the cylindrical adapter module.

The adapter module 32 further includes a first channel 42 and a second channel 44 to allow wires to be routed up through the fixture rod or stem 24 to the LED board 35. Furthermore, the adapter module 32 includes three threaded cavities 46 for receiving a screw or other means for fastening the metal core PCB 35 to the top surface 34 of the adapter module 32. It is to be appreciated that the metal core PCB 35 can also be attached with fewer or more screws (e.g., at least one screw) or by rivets or adhesive, e.g., a thermally conductive adhesive. It is to be further appreciated that the attachment means for coupling the metal core PCB to the module 32, in certain embodiments will be thermally conductive to assist in transferring heat generated by the LEDs to the adapter module 32 and subsequently to the host light fixture.

Figures 6, 7:
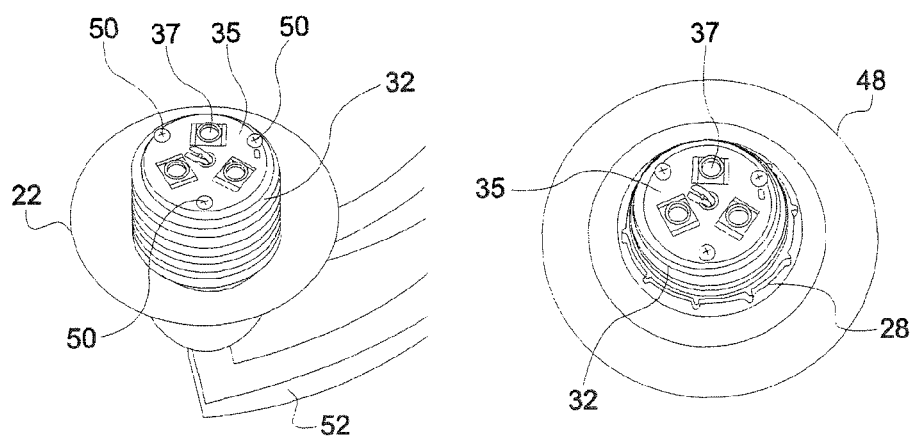
FIG. 6 illustrates the LED module of the present disclosure attached to an existing, off-the-shelf, light fixture.
FIG. 7 illustrates a fixture shade attached and secured to a lighting fixture by a standard shade retaining ring or nut coupled to the LED module of the present disclosure.

The threaded adapter module 32 with the LED board 35 attached is shown in FIG. 6. In addition, FIG. 6 shows the threaded adapter module 32 attached to an existing, off-the-shelf, light fixture 52. FIG. 7 illustrates a fixture shade 48 attached and secured by the standard shade retaining ring or nut 28. The fixture shade 48 includes a circular cavity that allows the module 32 to pass through when the shade is coupled to the base of the fixture. The fixture shade 48 is held against the fixture base 22 by the shade retaining ring or nut 28.

When assembled, the fixture threaded rod 24 is coupled to cavity 40 of the adapter module 32. At least two wires attached to the metal core PCB 35 are run through first and second channels 42, 44 and emanate from the fixture threaded rod 24. The metal core PCB 35 is then secured to the top surface 34 of the adapter module 32 using conventional screws 50 or other similar means. The fixture threaded rod 24 is then coupled to the fixture housing 52 and the at least two wires are coupled to a power source, driver circuitry or the like. The fixture shade 48 is then disposed over the LED module 32 and is secured in place by the shade retainer ring or nut 28.

The techniques of the present disclosure therefore allows heat generated by the LED to be conducted through the metal core PCB 35 to the adapter module 32, which then transfers the heat through the fixture threaded stem 24 and to the remaining fixture structure 52. This technique is especially beneficial for fixtures that have a downward facing shade (e.g., the pendant type fixture shown in FIG. 1(B)) that can trap the heat generated by the LED and prevent convective cooling. It is to be appreciated that the bottom portion 33 of the adapter module 32 can be configured to match or match with the base of the light fixture to increase the contact surface area between the bottom portion 333 and the base 22 to facilitate heat transfer from the adapter module 32 to the host lighting fixture.

Furthermore, the techniques of the present disclosure allow the LEDs to be highly recessed into the fixture allowing even illumination of the shade, for good aesthetic appearance.

Figures 8A, 8B:
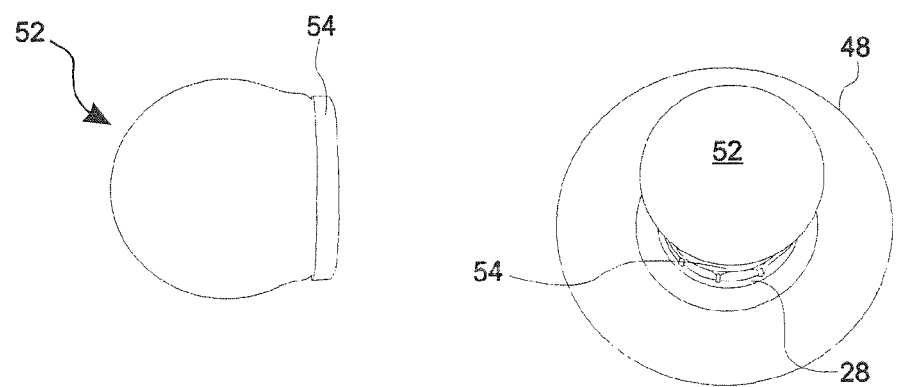
FIG. 8A is a side view of a lamp or light shade including an integral threaded ring in accordance with an embodiment of the present disclosure.
FIG. 8B illustrates the shade of FIG. 8A coupled to the LED module in accordance with the present disclosure.

The present disclosure may further (optionally) provide a diffuser over the LED assembly to better distribute light and to eliminate hot spots, if directly viewed. Such a diffuser 52 is shown in FIG. 8A. This diffuser 52 has an integral threaded ring 54 that screws onto the threaded adapter module 32 as shown in FIG. 8B, which illustrates the installed shade 48, standard shade retainer ring or nut 28, and the diffuser 52.

The LED module of the present disclosure can be easily retrofitted into existing fixture designs without changing the fixture, shade or shade retainer ring or nut. It is to be appreciated that there may be an electronic LED driver assembly (converting 120VAC to low voltage constant current for LED(s)) located elsewhere in the light fixture, and most likely in the ceiling cover or backplate that attaches the fixture to the ceiling or wall.

While the disclosure has been shown and described with reference to certain preferred embodiments thereof, it will be understood by those skilled in the art that various changes in form and detail may be made therein without departing from the spirit and scope of the disclosure.

What is claimed is:

1. An LED retrofit module for installing onto an incandescent light fixture comprising:
    a generally cylindrical adapter module having a first end and a second end, an outer surface of the cylindrical adapter module having a circular threaded configuration beginning at the first end of the cylindrical adapter module and extending toward the second end, the cylindrical adapter module including a flat top surface at the first end and a bottom portion at the second end;
    a light module including at least one LED disposed on the top surface;
    the bottom portion including a threaded cavity extending from the second end into the cylindrical adapter module along a central longitudinal axis, the threaded cavity being configured for receiving a threaded stem of the light fixture; and
    at least one channel coupled to the threaded cavity extending to the top surface of the first end of the cylindrical adapter module, the at least one threaded cavity configured to pass at least one electrical conductor from the threaded stem to the light module through the at least one channel.

2. The LED retrofit module as in claim 1, wherein the cylindrical adapter module is constructed from a thermally conductive material.

3. The LED retrofit module as in claim 2, wherein the thermally conductive material is selected from aluminum or copper.

4. The LED retrofit module as in claim 2, wherein the light module includes a metal core printed circuit board for supporting the at least one LED.

5. The LED retrofit module as in claim 4, further comprising a thermally conductive adhesive for coupling the metal core printed circuit board to the cylindrical adapter module.

6. The LED retrofit module as in claim 4, wherein the metal core printed circuit board is thermally coupled to the cylindrical adapter module.

7. The LED retrofit module as in claim 5, wherein the bottom portion is configured in a conical shape to mate with a base of the light fixture.

8. The LED retrofit module as in claim 1, further comprising a diffuser disposed over the first end of the cylindrical adapter module to distribute light emanating from the at least one LED.

9. The LED retrofit module as in claim 8, wherein the diffuser includes an integral threaded ring to couple the diffuser directly to the threaded outer surface of the cylindrical adapter module.

10. An LED light assembly comprising:
    a light fixture including base and a threaded, hollow stem extending from the base, at least one electrical conductor passing through the stem; and
    an LED module including:
        a generally cylindrical adapter module having a first end and a second end, an outer surface of the cylindrical adapter module having a circular threaded configuration beginning at the first end of the cylindrical adapter module and extending toward the second end, the cylindrical adapter module including a flat top surface at the first end and a bottom portion at the second end;
        a light module including at least one LED disposed on the top surface;
        the bottom portion including a threaded cavity extending from the second end into the cylindrical adapter module along a central longitudinal axis, the threaded cavity being configured for receiving the threaded stem of the light fixture when the LED module is mounted to the base of the light fixture; and
        at least one channel coupled to the threaded cavity extending to the top surface of the first end of the cylindrical adapter module, the at least one threaded cavity configured to pass the at least one electrical conductor from the threaded stem to the light module through the at least one channel.

11. An LED light assembly as in claim 10, further comprising:
    a shade including a circular cavity, the shade being coupled to the base of the light fixture, wherein the cylindrical adapter module passes through the cavity of the shade; and
    a retainer nut for retaining the shade against the base, the retainer nut configured for mating with the threaded configuration on the outer surface of the cylindrical adapter module.

12. The LED light assembly as in claim 11, wherein the cylindrical adapter module is constructed from a thermally conductive material.

13. The LED light assembly as in claim 12, wherein the light module includes a metal core printed circuit board for supporting the at least one LED.

14. The LED light assembly as in claim 13, further comprising a thermally conductive adhesive for coupling the metal core printed circuit board to the cylindrical adapter module.

15. The LED light assembly as in claim 14, wherein the bottom portion is configured in a conical shape to mate with the base of the light fixture.

16. The LED light assembly as in claim 15, further comprising a diffuser disposed over the first end of the cylindrical adapter module to distribute light emanating from the at least one LED.

17. The LED light assembly as in claim 16, wherein the diffuser includes an integral threaded ring to couple the diffuser directly to the threaded outer surface of the cylindrical adapter module.

* * * * *